US008734141B2

(12) United States Patent
Slay et al.

(10) Patent No.: US 8,734,141 B2
(45) Date of Patent: May 27, 2014

(54) STATOR/ROTOR ASSEMBLIES HAVING ENHANCED PERFORMANCE

(75) Inventors: Jeremy B. Slay, Forth Worth, TX (US); John Snyder, Cypress, TX (US); Victor Gawski, Aberdeen (GB); Winston J. Webber, Arbroath (GB)

(73) Assignee: Halliburton Energy Services, P.C., Houston, TX (US)

( * ) Notice: Subject to any disclaimer, the term of this patent is extended or adjusted under 35 U.S.C. 154(b) by 343 days.

(21) Appl. No.: 12/876,515

(22) Filed: Sep. 7, 2010

(65) Prior Publication Data

US 2011/0070111 A1 Mar. 24, 2011

(30) Foreign Application Priority Data

Sep. 23, 2009 (WO) ................ PCT/US2009/057963

(51) Int. Cl.

| | |
|---|---|
| ***F01C 1/10*** | (2006.01) |
| ***F01C 5/00*** | (2006.01) |
| ***F03C 2/00*** | (2006.01) |
| ***F03C 4/00*** | (2006.01) |
| ***F04C 2/00*** | (2006.01) |
| ***F04C 5/00*** | (2006.01) |
| ***F04C 18/00*** | (2006.01) |
| ***F16N 13/20*** | (2006.01) |

(52) U.S. Cl.
USPC ............................................................ 418/48

(58) Field of Classification Search
USPC .............................. 418/1, 2, 41–50, 152, 178
See application file for complete search history.

(56) References Cited

U.S. PATENT DOCUMENTS

| | | | | |
|---|---|---|---|---|
| 2,240,056 | A | 4/1941 | Schmitz | |
| 4,991,292 | A | 2/1991 | Bostel | |
| 5,171,138 | A | 12/1992 | Forrest | |
| 5,759,019 | A * | 6/1998 | Wood et al. | 418/48 |
| 6,019,583 | A * | 2/2000 | Wood | 418/48 |
| 6,102,681 | A * | 8/2000 | Turner | 418/48 |
| 6,183,226 | B1 * | 2/2001 | Wood et al. | 418/48 |
| 6,309,195 | B1 * | 10/2001 | Bottos et al. | 418/48 |
| 6,336,796 | B1 * | 1/2002 | Cholet et al. | 418/48 |
| 6,604,921 | B1 * | 8/2003 | Plop et al. | 418/48 |

(Continued)

FOREIGN PATENT DOCUMENTS

| | | |
|---|---|---|
| EP | 1040275 B1 | 9/2003 |
| JP | 02-042190 A | 2/1990 |

OTHER PUBLICATIONS

International Search Report and Written Opinion issued Feb. 4, 2010 for PCT Patent Application No. PCT/US/09/057963, 11 pages.

(Continued)

*Primary Examiner* — Kenneth Bomberg
*Assistant Examiner* — Dapinder Singh
(74) *Attorney, Agent, or Firm* — Smith IP Services, P.C.

(57) ABSTRACT

A stator/rotor assembly includes at least one extruded preform bonded to a stator housing and/or a rotor mandrel. A method of constructing a stator/rotor assembly includes extruding at least one preform, and bonding the preform to a stator housing and/or a rotor mandrel. A method of constructing a stator includes applying multiple polymer strips to a bladder; and bonding the polymer strips to a stator housing while compressing the polymer strips between the bladder and the stator housing, without injection molding. A method of constructing a rotor includes applying multiple polymer strips to a rotor mandrel, and bonding the polymer strips to the rotor mandrel while compressing the polymer strips between a bladder and the rotor mandrel, without injection molding.

35 Claims, 8 Drawing Sheets

(56) References Cited

U.S. PATENT DOCUMENTS

| | | | | |
|---|---|---|---|---|
| 6,604,922 | B1 * | 8/2003 | Hache | 418/48 |
| 6,881,045 | B2 * | 4/2005 | Zitka et al. | 418/48 |
| 6,905,319 | B2 * | 6/2005 | Guo | 418/48 |
| 7,083,401 | B2 * | 8/2006 | Hooper | 418/48 |
| 7,192,260 | B2 * | 3/2007 | Lievestro et al. | 418/48 |
| 7,396,220 | B2 | 7/2008 | Delpassand et al. | |
| 2002/0084029 | A1 | 7/2002 | Turner et al. | |
| 2003/0173774 | A1 | 9/2003 | Reynolds, Jr. | |
| 2005/0089430 | A1 | 4/2005 | Hooper | |
| 2005/0285305 | A1 | 12/2005 | Neuroth | |
| 2006/0153724 | A1 | 7/2006 | Delpassand | |
| 2008/0050259 | A1 | 2/2008 | Hooper | |
| 2008/0264593 | A1 | 10/2008 | Sindt et al. | |
| 2008/0304991 | A1 | 12/2008 | Speckert | |
| 2008/0304992 | A1 | 12/2008 | Hooper et al. | |
| 2009/0152009 | A1 | 6/2009 | Slay et al. | |
| 2010/0038142 | A1 | 2/2010 | Snyder et al. | |

OTHER PUBLICATIONS

Industrial Linings, Inc.; "Surgace Preparation for Rubber Lining", product online article, dated Aug. 4, 2009, 2 pages.

Halliburton; "Swell Technology Systems", Easywell presentation, dated 2010, 55 pages.

Halliburton; "Record Number of Isolation Points Run in a Single Lateral", Easywell brochure, H06123, dated Nov. 2010, 2 pages.

* cited by examiner

STATOR/ROTOR ASSEMBLIES HAVING ENHANCED PERFORMANCE

CROSS-REFERENCE TO RELATED APPLICATION

This application claims the benefit under 35 USC §119 of the filing date of International Application Serial No. PCT/US09/57963, filed Sep. 23, 2009. The entire disclosure of this prior application is incorporated herein by this reference.

BACKGROUND

The present disclosure relates generally to Moineau-type helical positive displacement pumps and fluid motors and, in an embodiment described herein, more particularly provides for stator/rotor assemblies which have enhanced performance.

Moineau-type fluid pumps and motors rely on an interference fit between an internal helically shaped rotor and an external stator having inwardly extending helically shaped lobes. The interference fit enables the rotor to seal against the stator and form chambers which advance axially along the pump or motor as the rotor rotates relative to the stator. The interference fit is facilitated typically by making the stator lobes out of a resilient material, such as an elastomer or other polymer material.

Unfortunately, over time the repeated flexing of the lobe material, the presence of abrasive particles in the fluid being pumped or driving the motor, chemical breakdown, high temperatures, etc. can lead to failure of the material. It would be desirable to use materials with superior toughness, in order to extend the life of the stator lobes, but since stator linings are generally formed by an injection molding process, the range of materials which can be used is limited to those suitable for injection molding.

Therefore, it will be appreciated that improvements are needed in the art of constructing stator/rotor assemblies for Moineau-type pumps and motors. These improvements may be useful in enhancing the durability of lobes formed in stators and/or on rotors.

DETAILED DESCRIPTION

Figure 1:
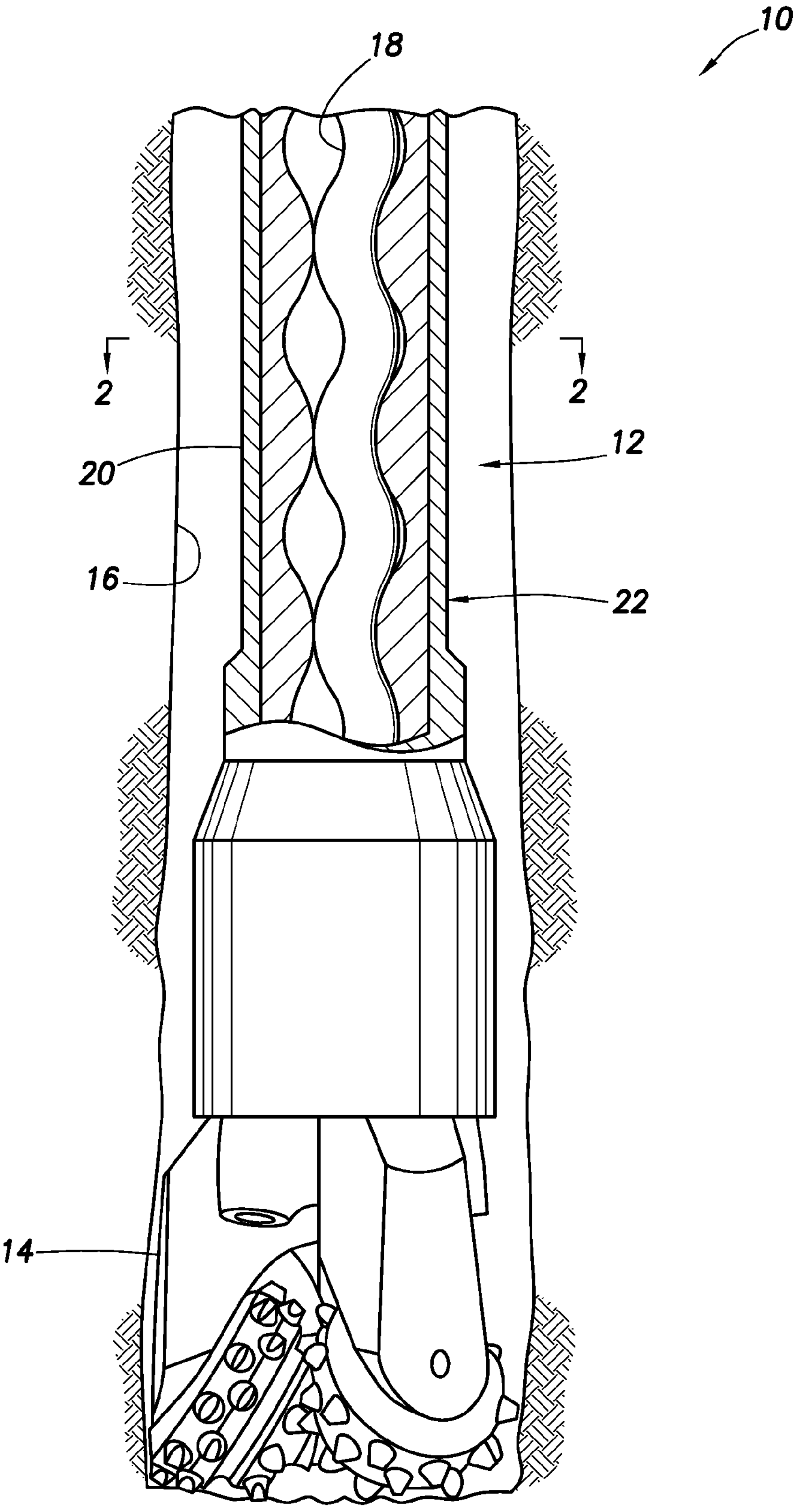
FIG. 1 is a schematic view of a well drilling system embodying principles of the present disclosure.

Representatively illustrated in FIG. 1 is a well drilling system 10 which embodies principles of the present disclosure. The system 10 includes a Moineau-type fluid motor, known to those skilled in the art as a "mud motor" 12. The mud motor 12 is used to drive a drill bit 14 for drilling a wellbore 16.

In operation, the mud motor 12 and drill bit 14 are connected at a lower end of a tubular drill string. Drilling fluid (typically referred to as "mud") is circulated down through the drill string, passing through the mud motor 12 and out of the drill bit 14.

As the mud flows through the mud motor 12, the pressurized fluid causes a rotor 18 to rotate within a stator 20. The rotor 18 is connected to the drill bit 14, and so rotation of the rotor causes the drill bit to rotate, in order to drill the wellbore 16.

However, it should at this point be emphasized that the well drilling system 10 and mud motor 12 are merely one example of an application of the principles of the present disclosure. Many other applications are possible, for example, in stator/rotor assemblies used in positive displacement pumps or other Moineau-type devices, and in other industries (such as the food or disposal industries, in which solids-laden fluids are pumped, etc.). Thus, the principles of this disclosure are not limited at all to the details of the system 10 or mud motor 12 as depicted in FIG. 1 and described herein, or to use of stator/rotor assemblies in any particular application or industry.

The mud motor 12 as shown in FIG. 1 includes a stator/rotor assembly 22 which comprises at least the rotor 18 and the stator 20. As mentioned above, the rotor 18 rotates about its longitudinal axis relative to the stator 20 in response to fluid flow through the assembly 22. However, in other applications (such as in a positive displacement pump), fluid may flow through the assembly 22 in response to rotation of the rotor 18 relative to the stator 20.

Furthermore, other Moineau-type devices can be constructed utilizing the principles of this disclosure, in which the stator 20 rotates relative to the rotor 18 (either in response to fluid flow through a stator/rotor assembly, or in order to cause fluid to flow through the stator/rotor assembly). Thus, the term "rotor" is not used herein necessarily to require rotation of such a structure, and the term "stator" is not used herein necessarily to require that such a structure remain stationary, during operation of a stator/rotor assembly. Instead, there is merely relative rotation between a rotor and a stator, with the rotor being positioned within the stator.

Figure 2:
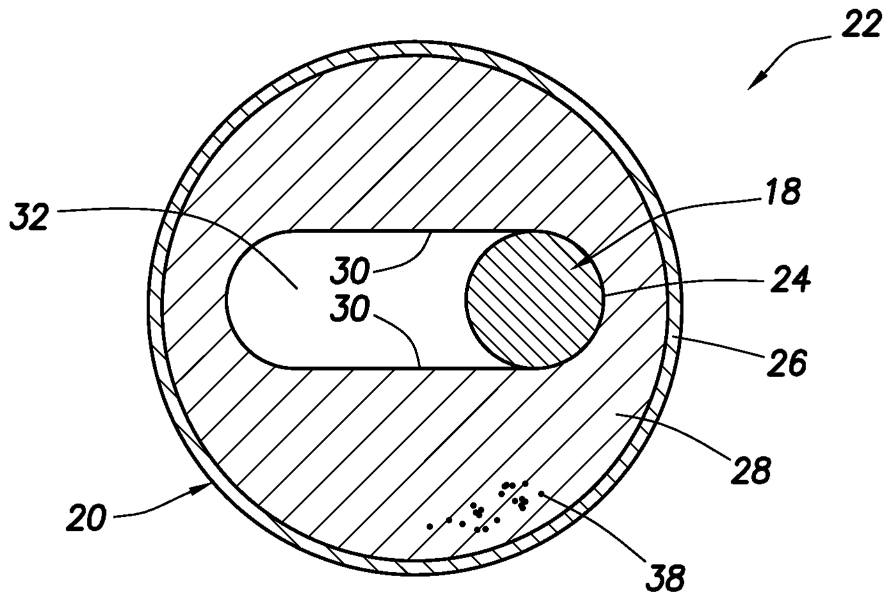
FIG. 2 is an enlarged scale schematic cross-sectional view of a stator/rotor assembly used in the well drilling system, taken along line 2-2 of FIG. 1, the stator/rotor assembly embodying principles of the present disclosure.

Referring additionally now to FIG. 2, an enlarged scale schematic cross-sectional view of one configuration of the stator/rotor assembly 22 is representatively illustrated. In this configuration of the assembly 22, the rotor 18 has one outwardly extending helically shaped lobe 24.

The stator 20 includes an outer tubular stator housing 26 and an inner stator lining 28. Two inwardly extending lobes 30 are formed in the stator lining 28. Between the rotor 18 and the stator lining 28 is formed a cavity 32 which displaces axially through the stator/rotor assembly 22 in response to relative rotation between the rotor and stator 20.

In this configuration of the stator/rotor assembly 22, the stator lining 28 is produced by extruding the stator lining as a preform 34 (see FIGS. 4, 9 & 12) with the lobes 30 already formed therein. The lobes 30 may be helically formed in the preform 34 as it is extruded, or the lobes may extend linearly in the preform, and then the preform may be twisted about its longitudinal axis to helically orient the lobes therein.

The stator lining 28 may be made of any suitable material which can be successfully extruded. Such materials are of much wider scope than those typically used in injection molding processes (for example, the materials may have higher viscosity and/or higher molecular weight than those which may be used in injection molding). As a result, tougher and more durable materials may be used for the extruded stator lining 28, as opposed to typical injection molded stator linings.

As described more fully below, the stator lining 28 can be bonded to the stator housing 26 by compressing the stator lining between the housing and a bladder 36 (see FIGS. 7, 8 & 13). A pressure differential across the bladder 36 is applied to compress the stator lining 28 against the housing 26, and the stator lining can be cured while being compressed using the bladder.

However, it should be understood that use of the bladder 36 is not necessary, since the stator lining 28 could be compressed against the housing 26 in other ways, such as by applying pressure directly to the stator lining (e.g., hydraulically, mechanically or by use of centrifugal force). Mechanical pressure can be applied, for example, using rollers or dies. Centrifugal force can apply pressure, for example, via use of a centrifuge.

If hydraulic pressure is used, then the fluid used to apply the pressure to the stator lining 28 (or any of the performs 34 described below) can be provided with treatments for the elastomer. For example, such treatments can include PTFE particles for impregnating the elastomer with lubricant, reinforcement particles, solid lubricant which melts at elevated temperature, and treatments which otherwise enhance performance of the elastomer. Thus, the elastomer can be improved by such treatments while it is being compressed against the housing 26 (or the rotor mandrel 44 described below).

The hydraulic fluid used to apply the pressure to the stator lining 28 (with or without use of the bladder 36) could, for example, comprise a heat resistant fluid, such as silicone fluid. As another alternative, hot isostatic pressing may be used, with pneumatics or hydraulics to apply the pressure.

The stator housing 26 is preferably made of a relatively high strength ductile material (such as various grades of steel, etc.), although other materials may be used, if desired. The stator lining 28 is preferably made of a tough and durable resilient polymer material, such as nitrile (NBR or XNBR), hydrogenated acrylonitrile butadiene (HNBR, HSN or XHNBR), fluorocarbon (FKM), base resistant elastomers (FEPM) or tetrafluoroethylene and propylene (FEPM). Other suitable materials include perfluoroelastomer (FFKM), ethylene propylene diene (EPDM), silicone, fluorosilicone, natural rubber, polychloroprene rubber (CR), ethylene propylene (EP), epichlorohydrin, other "rubber" compounds, (PPS), polyetheretherketone (PEEK), polyetheralkylketone (PEAK), polyetherketone-ketone (PEKK), sulphones, polysulphones (PSU), polyimide (PI), polyamide (PA), polyetherimide (PEI), other thermoplastics, thermoplastic elastomers, thermosets, other elastomers, thermoplastic vulcanates, phenolics, butyl rubber, polyisoprene rubber, polyvinylidene fluoride (PVDF), shape memory polymers, etc.

Any of the other materials mentioned in U.S. Application Publication No. 2009/0152009 may be used for the stator lining 28, as well. Furthermore, nano reinforcement particles 38 may be included in the stator lining material, as also described in U.S. Application Publication No. 2009/0152009, which is assigned to the assignee of the present application. The nano particles 38 could, for example, comprise carbon black and/or silica particles.

Figure 3:
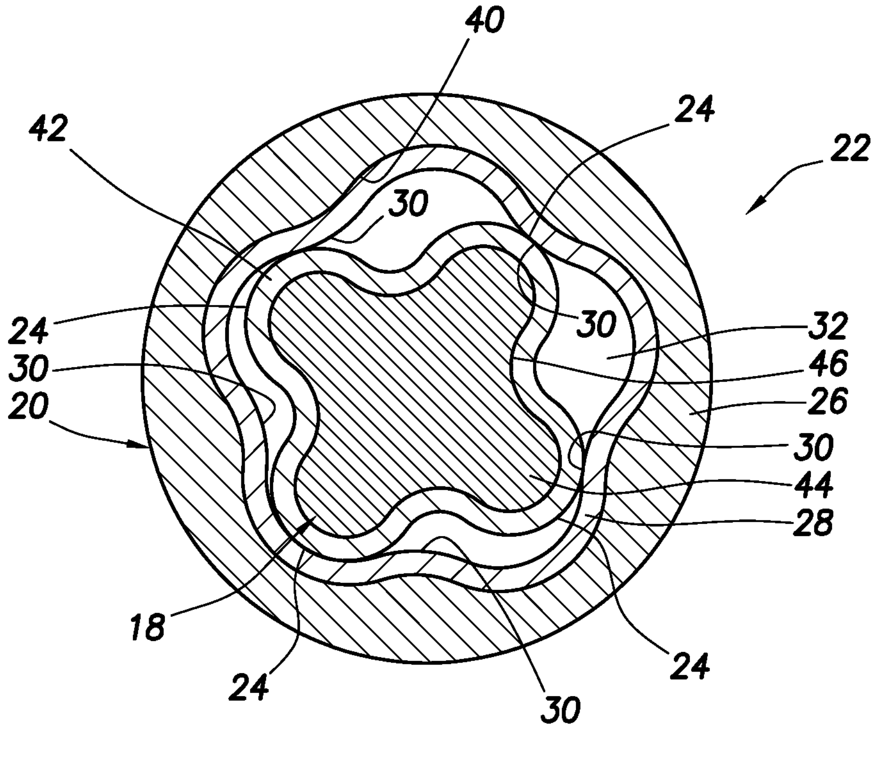
FIG. 3 is a cross-sectional view of another construction of the stator/rotor assembly.

Referring additionally now to FIG. 3, another configuration of the stator/rotor assembly 22 is representatively illustrated. The assembly 22 of FIG. 3 differs from that of FIG. 2 in various ways. Most apparent is that, as depicted in FIG. 3, the rotor 18 has four lobes 24 and the stator 20 has five lobes 30.

It should be understood that any number of lobes 24, 30 may be used on the rotor 18 and stator 20, respectively. For proper operation, the stator 20 preferably has one more lobe 30 than the number of lobes 24 on the rotor 18.

Another difference in the FIG. 3 configuration is that the stator lining 28 has a substantially consistent thickness, with the lobes 30 being formed by an internal helically extending profile 40 in the stator housing 26. Thus, the stator lining 28 in this example forms an inner "layer" in the stator housing 26. Preferably, the thickness of the stator lining 28 varies by no more than approximately ±10% about the interior of the stator housing 26, but could vary as much as ±200% about the stator housing, in keeping with the principles of this disclosure.

However, it should be understood that it is not necessary for the stator housing 26 to have the profile 40 formed internally therein. For example, the interior of the housing 26 could be cylindrically shaped, as depicted for the housing in FIG. 2, with the stator lining 28 also having a cylindrically shaped exterior.

Yet another difference in the FIG. 3 configuration is that the lobes 24 on the rotor 18 are formed on an outer sheath 42 bonded to the exterior of a rotor mandrel 44. The rotor mandrel 44 has an external helically extending profile 46 formed thereon, with the sheath 42 forming an outer "layer" on the rotor 18.

The rotor mandrel 44 is preferably made of a relatively high strength ductile material (such as various grades of steel, etc.), although other materials may be used, if desired. The rotor sheath 42 is preferably made of a tough and durable resilient polymer material, such as any of the materials mentioned above for the stator lining 28, including those mentioned in the U.S. Application Publication No. 2009/0152009 (with nano reinforcement particles therein, if desired).

In other embodiments, the preform 34, the stator lining 28 and/or the rotor sheath 42 could be made of materials other than polymer materials. These other materials could include metals (whether or not powdered), graphitic compounds and ceramics. Inorganic polymers and/or crystalline polymers could be used, as well. Any combination of materials (e.g., organic polymers, inorganic polymers, crystalline polymers, ceramics, graphitic compounds, metals, etc.) may be used in the preform 34, the stator lining 28 and/or the rotor sheath 42 in keeping with the principles of this disclosure.

Similar to the stator lining 28 discussed above, the rotor sheath 42 may be produced by extruding the material from an extruder. The lobes 24 may be helically formed on the rotor sheath 42 as it is extruded, or the rotor sheath may have the lobes extending linearly along the preform 34 as it is extruded, and then the rotor sheath may be twisted about its longitudinal axis to helically orient the lobes.

Alternatively, the preform 34 used as the stator lining 28 or rotor sheath 42 may have a cylindrical tubular shape when it is extruded. Then, the preform 34 takes the shape of the internal profile 40 in the stator housing 26 or the external profile 46 on the rotor mandrel 44 when positioned in the stator housing or on the rotor mandrel.

Preferably, the preform 34 is heated when it is cured and while it is being compressed against the stator housing 26 or rotor mandrel 44. Such heat may be applied by various techniques, for example, electrical resistance heating, mocrowave heating, etc. Alternatively, the preform 34 may be cured prior to being bonded to the stator housing 26 or rotor mandrel 44. The bonding of the preform 34 to the stator housing 26 or rotor mandrel 44 may or may not require application of heat.

If the rotor sheath 42 or stator lining 28 comprises a shape memory polymer, the preform 34 is preferably extruded so that it has a shape which will conform complementarily to the rotor mandrel 44 or stator housing 26, respectively, the preform is then heated, deformed, cooled so that it retains its deformed shape, installed on the rotor mandrel or in the stator housing, and then again heated so that it tends to return to its original shape.

For example, when used for the rotor sheath 42, the shape memory polymer preform 34 would be initially extruded such that its interior lateral dimension is smaller than the exterior dimension of the rotor mandrel 44. The preform 34 would then be heated, radially enlarged, cooled so that it retains its radially enlarged shape, slid onto the rotor mandrel 44, and then heated again, so that it tends to return to its original shape, thereby shrink-fitting the preform onto the rotor mandrel.

When used for the stator lining 28, the shape memory polymer preform 34 would be initially extruded such that its exterior lateral dimension is greater than the internal lateral dimension of the stator housing 26. The preform 34 would then be heated, axially stretched so that it is radially reduced, cooled so that it retains its radially reduced shape, slid onto the stator housing 26, and then heated again, so that it tends to return to its original shape, thereby tightly securing the preform into the stator housing.

Figure 4:
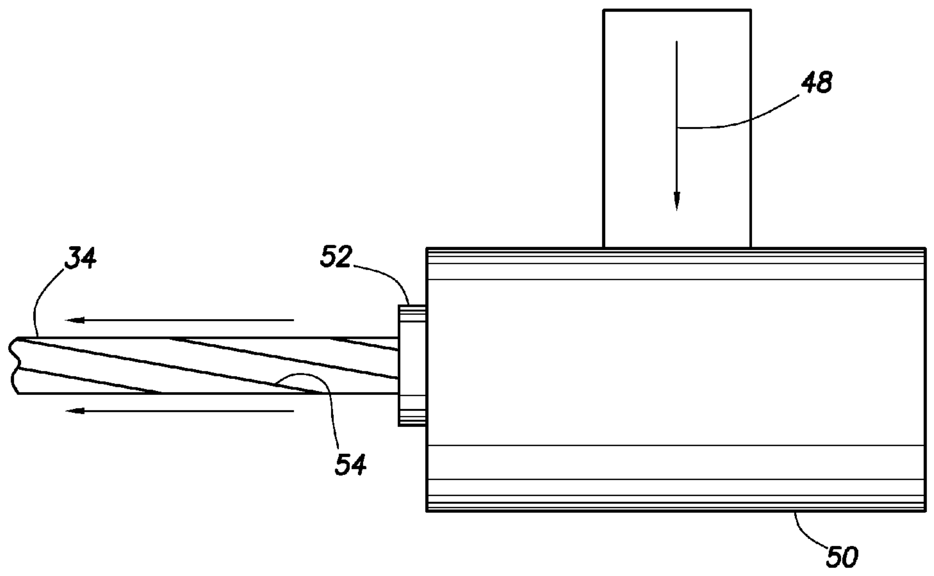
FIG. 4 is a schematic elevational view of initial steps in a method of constructing a stator/rotor assembly, a stator lining being extruded from an extruder.

Referring additionally to FIG. 4, a method of extruding the preform 34 is representatively illustrated. The appropriate preform material 48 is supplied to an extruder 50 which forces the material through a die 52, thereby forming the preform 34 with a helical profile 54.

The profile 54 is depicted in FIG. 4 as being an external profile (e.g., complementarily shaped relative to the internal profile 40 in the stator housing 26), but an internal helically extending profile could be formed, as well. For example, the stator lining 28 as depicted in FIG. 2 could be extruded using the method of FIG. 4, with the lobes 30 helically extending within the stator lining.

If the preform 34 comprises a ceramic material, then the extruder 50 preferably is of the twin screw type. A binder mixed with the ceramic material is preferably sintered from the preform 34 after the extrusion process. Similarly, if the preform 34 comprises a graphitic compound, a binder extruded with the material is either consumed after the extrusion process or, alternatively, may remain in the material if it does not adversely affect performance.

If the preform 34 comprises a powdered metal, the extrusion process can yield a desirably isotropic grain structure.

Figure 5:
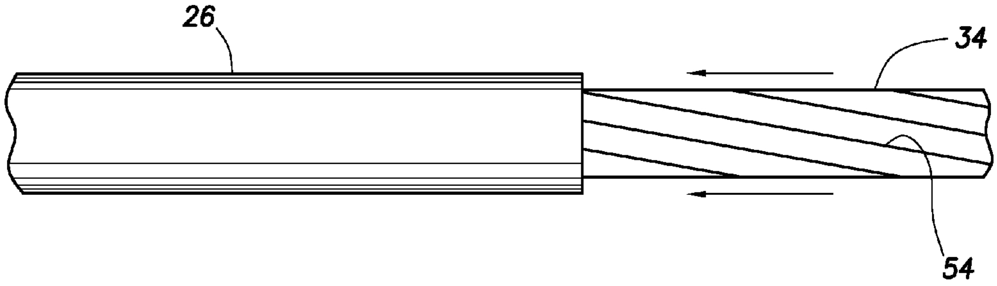
FIG. 5 is a schematic elevational view of further steps in the method, the stator lining being installed within a stator housing.

In FIG. 5, the preform 34 is depicted being installed within the stator housing 26 of FIG. 3. In this step, the external profile on the preform 34 will complementarily engage the internal profile 40 in the stator housing 26. Thus, the preform 34 can be "threaded" into the stator housing 26, or it could be collapsed radially, then installed in the stator housing 26, and then radially expanded into engagement with the internal profile 40.

Figure 6:
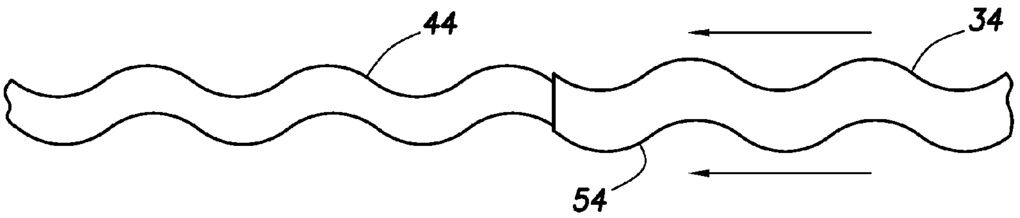
FIG. 6 is a schematic elevational view of further steps in the method, a rotor sheath being installed on a rotor mandrel.

In FIG. 6, this process as applied to the rotor 18 is depicted, in the case where the preform 34 is used as the rotor sheath 42. The preform 34 is depicted in FIG. 6 as it is being installed onto the rotor mandrel 44. The preform 34 can be "threaded" onto the rotor mandrel 44.

Note that the rotor mandrel 44 depicted in FIG. 6 is of the one lobe 24 configuration of FIG. 2. This demonstrates that any of the configurations of the rotor 18 described herein can be produced with the sheath 42 on the rotor mandrel 44, in keeping with the principles of this disclosure.

Figure 7:
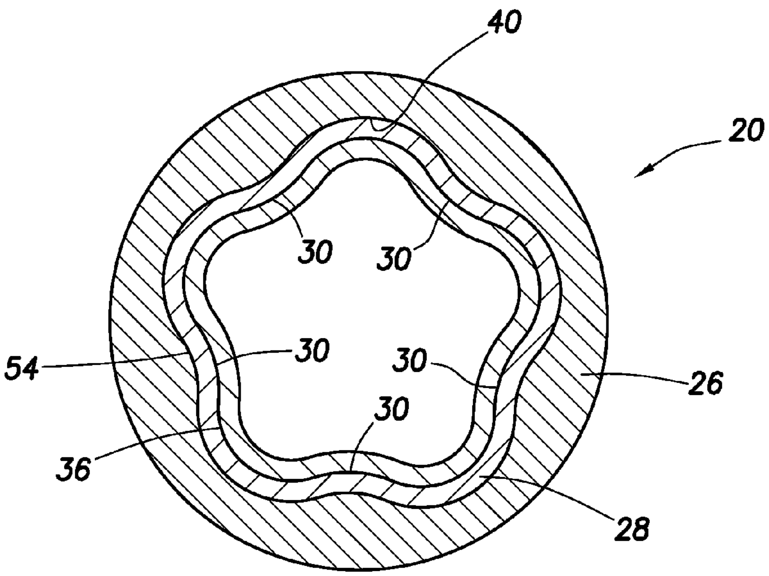
FIG. 7 is a schematic cross-sectional view of another construction of a stator for the stator/rotor assembly.

Referring now to FIG. 7, the stator 20 is representatively illustrated after the preform 34 has been installed in the stator housing 26, thereby forming the stator lining 28. A bladder 36 inside the stator lining 28 is used to compress the stator lining 28 against the stator housing 26 and thereby bond the stator lining to the housing.

A pressure differential is preferably applied across the bladder 36 to produce the compression of the stator lining 28. For example, increased pressure could be applied to the interior of the bladder 36. Alternatively, or in addition, pressure between the bladder 36 and the housing 26 could be reduced (e.g., by pulling a vacuum between the bladder and the housing) to thereby produce the pressure differential across the bladder. If the bladder 36 is not used, pressure can be applied directly to the stator lining 28 (e.g., hydraulically, mechanically or by use of centrifugal force).

The bladder 36 could be complementarily shaped relative to the stator lining 28 and/or the stator housing 26 (e.g., with lobes similar to the lobes 30 helically extending thereon) prior to being installed in the stator lining. Alternatively, the bladder 36 could have a tubular cylindrical shape prior to the pressure differential being applied across the bladder, and then the bladder could conform to the shape of the stator lining 28 and/or housing 26 when the differential pressure is applied across the bladder.

Figure 8:
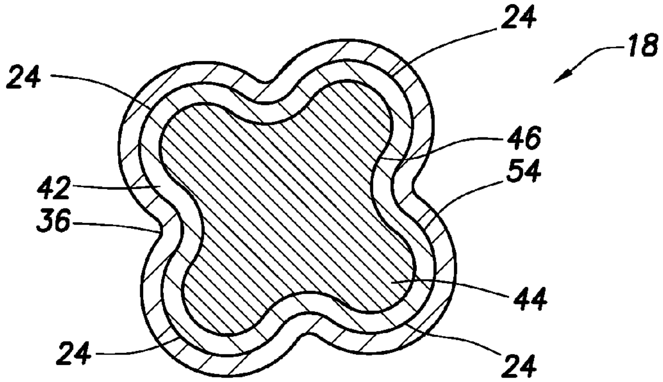
FIG. 8 is a schematic cross-sectional view of another construction of a rotor for the stator/rotor assembly.

Referring additionally now to FIG. 8, the rotor 18 is representatively illustrated after the preform 34 has been installed on the rotor mandrel 44, thereby forming the rotor sheath 42. In this case, the bladder 36 is installed onto the rotor 18 and is used to compress the rotor sheath 42 against the rotor mandrel 44 and thereby bond the rotor sheath to the mandrel.

A pressure differential is preferably applied across the bladder 36 to produce the compression of the rotor sheath 42. For example, increased pressure could be applied to the exterior of the bladder 36. Alternatively, or in addition, pressure between the bladder 36 and the rotor mandrel 44 could be reduced (e.g., by pulling a vacuum between the bladder and the rotor mandrel) to thereby produce the pressure differential across the bladder.

The bladder 36 could be complementarily shaped relative to the rotor sheath 42 and/or the rotor mandrel 44 (e.g., with lobes similar to the lobes 24 helically extending thereon) prior to being installed on the rotor 18. Alternatively, the bladder 36 could have a tubular cylindrical shape prior to the pressure differential being applied across the bladder, and then the bladder could conform to the shape of the rotor sheath 42 and/or rotor mandrel 44 when the differential pressure is applied across the bladder. If the bladder 36 is not used, pressure can be applied directly to the rotor sheath 42 (e.g., hydraulically, mechanically or by use of centrifugal force).

Figure 9:
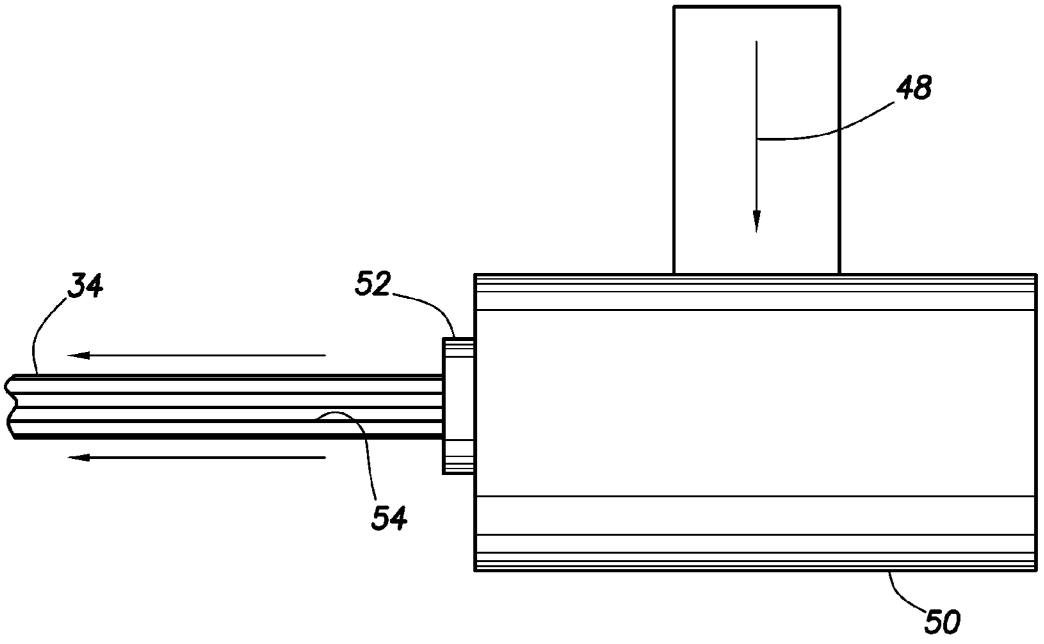
FIG. 9 is a schematic elevational view of initial steps in another version of the method, the stator lining being extruded from an extruder.

Referring additionally now to FIG. 9, the method is depicted in another example, in which the profile 54 does not extend helically on the preform 34 when it is extruded from the extruder 50. Instead, the profile 54 extends linearly along the longitudinal axis of the preform 34.

Figure 10:
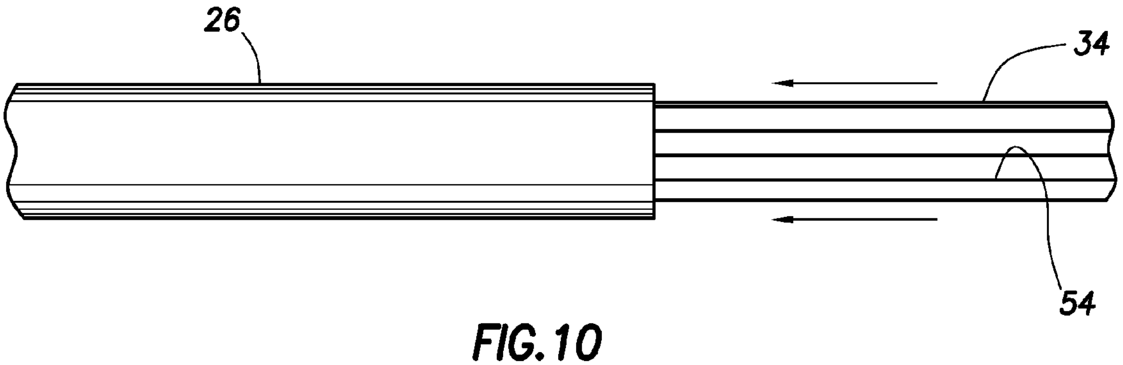
FIG. 10 is a schematic elevational view of further steps in the other version of the method, the stator lining being installed within a stator housing.

In FIG. 10, the preform 34 is installed in the stator housing 26. The preform 34 may be twisted about its longitudinal axis as it is being installed in the stator housing 26 to thereby helically orient the profile 54 and "thread" the preform into the housing. Alternatively, the preform 34 could be twisted about its longitudinal axis after being installed in the stator housing 26.

Yet another alternative is to install the preform 34 onto the bladder 36 having a shape complementary to the profile 40 in the stator housing 26. Then, the bladder 36 with the preform 34 thereon can be installed in the stator housing 26 and the pressure differential applied across the bladder, so that the bladder and preform conform to the internal profile 40 in the stator housing. This technique can be used whether or not the profile 54 is formed on the preform 34 when it is extruded from the extruder 50.

Figure 11:
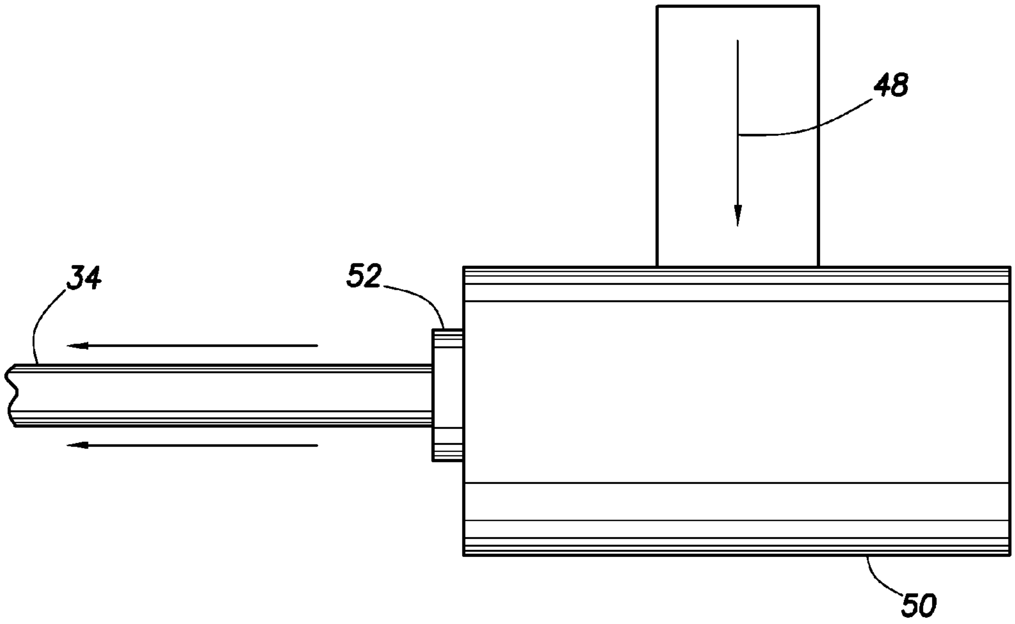
FIG. 11 is a schematic elevational view of initial steps in yet another version of the method, the stator lining being extruded from an extruder.

Referring additionally now to FIG. 11, another version of the method is representatively illustrated, in which the profile 54 is not formed on the preform 34 when it is extruded from the extruder 50. Instead, the preform 34 could have a cylindrical shape with a substantially consistent wall thickness.

Figure 12:
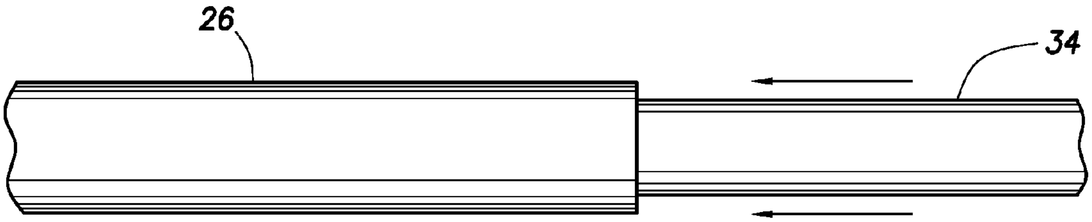
FIG. 12 is a schematic elevational view of further steps in the FIG. 11 version of the method, the stator lining being installed within a stator housing.

In FIG. 12, the preform 34 is installed in the stator housing 26. At this time, as depicted in FIG. 12, the preform 34 still does not have the profile 54 formed thereon. Instead, the preform 34 conforms to the shape of the profile 40 in the stator housing 26 when the pressure differential is applied across the bladder 36 and the preform is compressed against the housing. If the bladder 36 is not used, pressure can be applied directly to the preform 34 (e.g., hydraulically, mechanically or by use of centrifugal force).

In another example, as discussed above, the preform 34 could be installed onto the bladder 36 having a shape complementary to the profile 40 of the stator housing 26, at which time the preform 34 could take the complementary shape of the bladder 36 and profile 40. Or, the preform 34 may take a shape complementary to the profile 40 only after the pressure differential is applied across the bladder 36.

Although the techniques described above in relation to FIGS. 9-12 have been described as being used for the stator 20, it will be appreciated that these same techniques may be applied to the method of producing the rotor 18, as well. Thus, the preform 34 could be extruded with the profile 54 linearly formed thereon (as depicted in FIG. 9) or with no profile (as depicted in FIG. 10), and installed on the rotor mandrel 44. The preform 34 could take the shape of the external profile 46 of the rotor mandrel 44 upon installation thereon, upon installation within the bladder 36, or upon application of the pressure differential across the bladder.

Although the techniques described above in relation to FIGS. 4, 5 and 7-12 have been described as being used for the stator/rotor assembly 20 configuration of FIG. 3, it will be appreciated that these same techniques may be applied to the stator/rotor assembly configuration of FIG. 2, as well.

Preferably, the stator lining 28 and/or rotor sheath 42 is cured (e.g., by applying heat, exposing to UV radiation, microwaves, pressure, etc.) while the stator lining and/or rotor sheath is compressed against the respective stator housing 26 or rotor mandrel 44. By the end of the curing process, the polymer material should have achieved sufficient strength and toughness for its required application, with the stator lining 28 and/or rotor sheath 42 bonded securely to the respective stator housing 26 or rotor mandrel 44.

Figure 13:
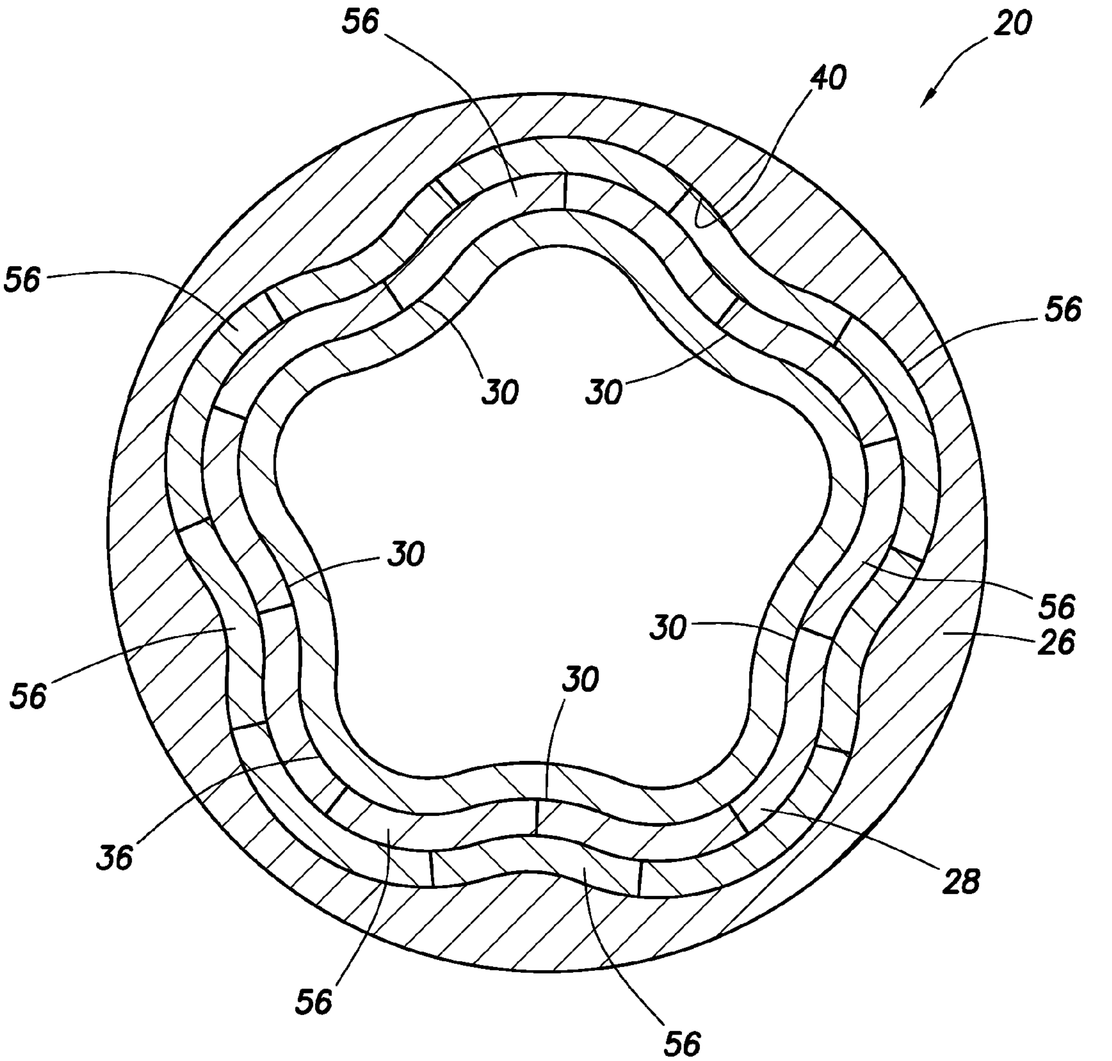
FIG. 13 is a schematic cross-sectional view of another construction of a stator for the stator/rotor assembly.

Referring additionally now to FIG. 13, another example of the stator 20 is representatively illustrated, in which the stator lining 28 is again formed without injection molding. However, instead of using the preform 34, multiple strips 56 of polymer material are layered between the stator housing 26 and the bladder 36 in calendared fashion.

Seams between the strips 56 may be oriented as desired with respect to the lobes 30, and with respect to the adjacent layers of strips. The strips 56 preferably extend helically along the length of the stator housing 26, but could extend linearly or in any other orientation, if desired.

The strips 56 can be installed onto the bladder 36 prior to installing the bladder with strips thereon into the stator housing 26. In that case, the bladder 36 would preferably have a shape complementary to the internal profile 40 of the housing 26 prior to the strips 56 being installed onto the bladder. Alternatively, the bladder 36 could have a generally tubular cylindrical shape when the strips 56 are installed thereon, and the bladder and strips could take on a shape complementary to the profile 40 when the pressure differential is applied across the bladder.

Note that preferably no injection molding is used in construction of the stator 20 configuration of FIG. 13. The strips 56 may be formed by an extrusion process.

As with the other configurations described above, the polymer material in the configuration of FIG. 13 is preferably cured while the strips 56 are compressed between the bladder 36 and the housing 26. During the curing process, the strips 56 combine to form the stator lining 28. The strips 56 are also bonded securely to the stator housing 26.

Although the configuration of FIG. 13 is described above as being used for construction of the stator 20, it will be appreciated that the same techniques may be used for construction of the rotor 18. For example, the strips 56 could be applied to the exterior of the rotor mandrel 44, and the bladder 36 may be used to compress the strips between the bladder and the rotor mandrel during the curing process.

As with the other embodiments described above, the strips 56 may be compressed against the rotor mandrel 44 or the housing 26 using pressure applied without use of the bladder 36. For example, the pressure could be applied hydraulically, mechanically or by use of centrifugal force.

Figure 14:
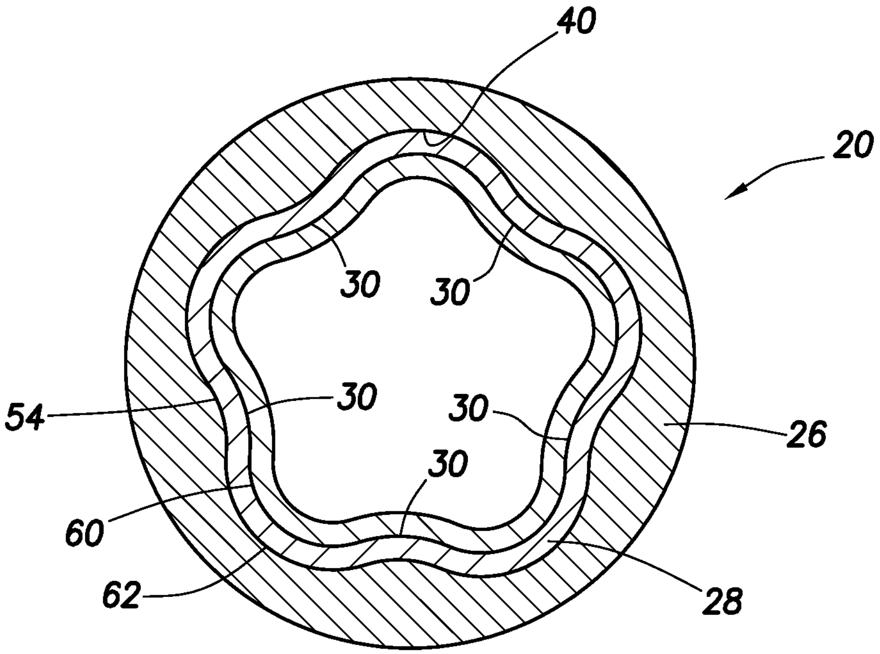
FIG. 14 is a schematic cross-sectional view of another construction of a stator for the stator/rotor assembly.

Referring additionally now to FIG. 14, the stator 20 is representatively illustrated in another configuration. As depicted in FIG. 14, the stator lining 28 includes multiple layers 60, 62. Although only two such layers 60, 62 are illustrated, any number of layers may be used in keeping with the principles of this disclosure.

In one example, the inner layer 60 could comprise a relatively tough and tear resistant material for direct contact with the rotor 18 and the fluid flowing through the assembly 22. The outer layer 62 could comprise a relatively compliant and shock absorbing material for resiliently supporting the inner layer 60 and forming a transition between the inner layer and the housing 26.

The layers 60, 62 could be separately extruded and/or separately bonded in the stator housing 26. Alternatively, the layers 60, 62 could be extruded as a single preform 34 and/or the layers could be together bonded in the stator housing 26 using any of the techniques described above. The layers 60, 62 could also be cured using any of the techniques described above (e.g., either before or after being installed in the stator housing 26).

Figure 15:
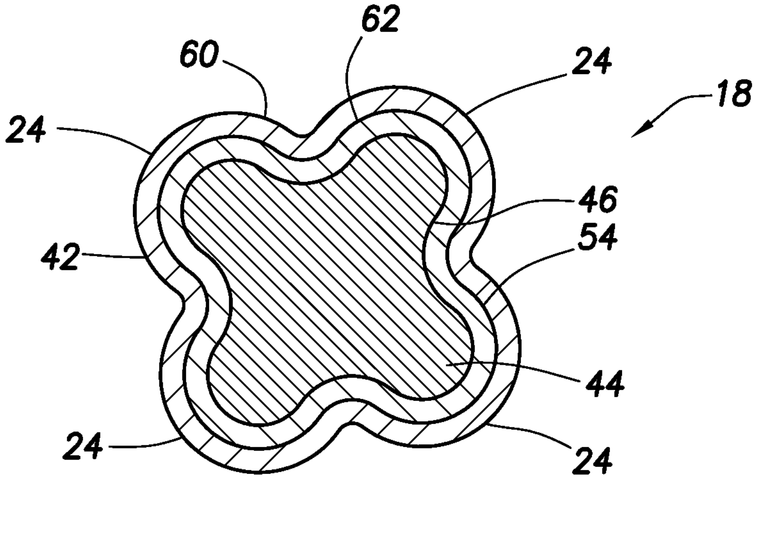
FIG. 15 is a schematic cross-sectional view of another construction of a rotor for the stator/rotor assembly.

Referring additionally now to FIG. 15, another configuration of the rotor 18 is representatively illustrated, in which the rotor sheath 42 is made up of the multiple layers 60, 62. In this configuration, the layer 60 is an outer layer, and the layer 62 is an inner layer.

The layers 60, 62 can be formed, cured and bonded to the rotor mandrel 44 using any of the techniques described above. The layers 60, 62 can be extruded separately or together, cured prior to or after being installed on the rotor mandrel 44, and bonded separately or together on the rotor mandrel.

The above disclosure enables improvements in the lifetime and performance of a stator motor or pump with the use of an enhanced polymer element manufacturing process. Stator motors for use in drilling applications are also known as "power sections" or "mud motors" and are comprised of single or multi lobe progressive cavity sections. Stator configurations can be used as pumps to transport fluid or as hydraulic motors to produce rotational motion.

The polymer elements can be made of materials including but not limited to elastomers, thermoplastic elastomers, thermoplastic vulcanates, other thermosets, and thermoplastics. These applications can be very demanding leading to failure of the stator motors because of the failure of the stator lining. The polymer elements can have problems with swell, degradation, hysteresis, heat build up, fatigue, abrasion, bond degradation and tearing during service.

The above disclosure describes a novel manufacturing process for stator/rotor assemblies used in pumps and power sections. The method involves the use of extruded preforms of polymer material rather than injection molding rubber into a stator housing or onto a rotor mandrel. The bonding of an extruded polymer preform to a metal or other rigid material substrate allows greater variation of polymer properties compared to the current injection molded products.

This method allows one to eliminate the injection molding process for the molding of polymers to the interior of stator housings and the exterior of rotor mandrels. This is desirable because the injection molding process limits the types of suitable polymer compounds and ultimately the final system performance because first and foremost the compound must be injection moldable. Injection moldable compounds are designed to have low uncured viscosity which is attained through low reinforcement and the addition of processing aids, oils and plasticizers.

These additional process aids allow the injection of long and thin sections of rubber but often reduce the effectiveness of rubber to metal bonds. Using injection moldable compounds with low uncured viscosities and process aids can also lead to final parts with inferior physical properties once the rubber is cured.

An extruded rubber preform does not require a low green viscosity, allowing one to use tougher compounds with improved impact, stress relaxation, compression set, tear, hysteresis, thermal conductivity, and bonding properties. This combination of improved properties will lead to enhanced stator lifetimes and performance.

Preferably, extruded polymer preforms are bonded in place to replace injection molded elements. This process improves the manufacturability of the polymer elements as well as the performance and service lifetime. Possible improvements include:

1. Use of tougher polymer compounds that no longer have a maximum viscosity requirement. Only the very toughest compounds cannot be extruded, so the range of suitable polymer compounds is expanded.

2. Extruded preforms can be made in traditional stator and rotor shapes such that the material thickness varies around the circumference to create the lobe profiles.

3. Extruded preforms can alternatively be provided as even thickness extrusions for the manufacture of even wall thickness elements.

4. The polymer material can be extruded into elements that are longer and thinner than anything available in an injection molded element.

5. The extrusion dies can be cut to make a helical extruded profile.

6. The preforms can be slid into stator housings or onto cylindrical or helical lobe profiled rotor mandrels to allow the extruded preform to retain its shape for storage.

7. The preforms can be homogeneous and void free without the knitlines created in typical injection molding processes.

8. A pressurized bladder can be inserted inside or outside the preform and used to apply compression pressure to the preform as it is bonded and/or cured inside the stator housing or on the rotor mandrel. Instead of pressurizing the bladder, a vacuum could be pulled between the bladder and the stator housing or rotor mandrel. Alternatively, a bladder may not be used, and pressure may be applied directly to the preform (either on the rotor or in the stator housing), e.g., hydraulically, mechanically or using centrifugal force.

9. A similar process can be used to bond the polymer element to the exterior of a rotor mandrel.

10. The bonding agents are better preserved because there is no smearing of the adhesive which can occur with the injection molding process. This significantly improves the manufacturing quality of the tool. Prior injection molding processes involved applying adhesive in a stator housing, allowing the adhesive to dry, and then injecting an elastomer into the housing. However, the adhesive breaks down at ~400 deg. F. (~200 deg. C.), a common temperature for injection molded elastomers, and the adhesive can be displaced and pre-cured through frictional heating by the elastomer as it is injected into the mold in the housing.

11. The quality of the polymer preform is easily verified because the entire preform can be inspected for flaws after extrusion and before installation in the stator housing or on the rotor mandrel.

12. Eliminates the need to join short stator sections to create a single long stator assembly.

13. The light weight bladder will not deflect the polymer material leading to thin material below the bladder and thick material above. The use of tougher, higher green modulus polymer material should also prevent this deflection and thin/thick spots.

14. Elminates the need to mold the tool vertically or with continuous rotation.

15. An adhesive can be used to bond the preform to the rotor or stator housing, which adhesive bonds well to both the preform and the rotor or stator housing. The adhesive can bond well to both an elastomer and metal, for example, an epoxy, etc. Alternatively, a separate adhesive may not be used, but the adhesive may be included in the preform as an additive.

More specifically, the above disclosure provides to the art a stator/rotor assembly 22 which includes at least one extruded preform 34 bonded to at least one of a stator housing 26 and a rotor mandrel 44.

The extruded preform 34 may comprise a stator lining 28 having multiple lobes 30 formed thereon which sealingly engage a rotor 18. A thickness of the extruded preform 34 may be substantially consistent. Alternatively, the lobes 30 may be formed by variations in a thickness of the extruded preform 34.

One extruded preform 34 may be bonded to the stator housing 26, and another extruded preform 34 may be bonded to the rotor mandrel 44.

The extruded preform 34 may conform to a generally helical shape of the stator housing 26 and/or the rotor mandrel 44.

The extruded preform 34 may include nano particle 38 reinforcement therein.

The extruded preform 34 may comprise a polymer material, a metal material and/or a ceramic material. If comprising a polymer material, the material may comprise a shape memory polymer material.

The extruded preform may comprise multiple layers 60, 62. The multiple extruded preform layers 60, 62 may be bonded to at least one of the stator housing 26 and the rotor mandrel 44. The layers 60, 62 may be made of different materials.

The extruded preform 34 may be impregnated with a lubricant.

Also described above is a method of constructing a stator/rotor assembly 22. The method includes extruding at least one preform 34, and bonding the preform 34 to at least one of a stator housing 26 and a rotor mandrel 44.

Bonding the preform 34 may be performed after extruding the preform 34.

Extruding the preform 34 may include extruding the preform 34 with at least one lobe 24, 30 formed thereon.

The method may include twisting the preform 34, thereby helically disposing the lobe 24, 30, after extruding the preform 34.

Extruding the preform 34 may include extruding the preform 34 without a lobe formed thereon.

Extruding the preform 34 may include extruding the preform 34 such that it has a helical shape.

Extruding the preform 34 may include extruding the preform 34 with helical lobes 24, 30 formed thereon.

Extruding the preform 34 may include extruding the preform 34 with a generally tubular shape having substantially consistent thickness.

The method may include conforming the preform 34 to at least one lobe 30, 24 formed on the stator housing 26 and/or the rotor mandrel 44.

Bonding the preform 34 may include compressing the preform 34 between a bladder 36 and the stator housing 26 and/or the rotor mandrel 44. Compressing the preform 34 may include applying a pressure differential across the bladder 36. Applying the pressure differential may include applying increased pressure to a side of the bladder 36 opposite the preform 34. Applying the pressure differential may include reducing pressure on a side of the bladder 36 facing the preform 34.

The method may include curing the preform 34 while compressing the preform 34.

The bladder 36 may have a generally helical shape. The bladder 36 may have a generally tubular non-helical shape.

The method may include incorporating nano reinforcement particles 38 into the preform 34.

The extruded preform 34 may comprise a stator lining 28 having multiple lobes 30 formed thereon.

The extruded preform 34 may be bonded to a stator housing 26 having multiple lobes 30 formed thereon.

A thickness of the extruded preform 34 may be substantially consistent.

The lobes 30 may be formed by variations in a thickness of the extruded preform 34.

A first extruded preform 34 may be bonded to the stator housing 26, and a second extruded preform 34 may be bonded to the rotor mandrel 44.

The extruded preform 34 may conform to a generally helical shape of the stator housing 26 and/or the rotor mandrel 44.

Bonding the preform 34 may include compressing the preform 34 against at least one of the stator housing 26 and the rotor mandrel 44 by applying pressure to the preform 34. Applying pressure to the preform 34 may include impregnating the preform 34 with a treatment. The treatment may include at least one of a lubricant and a reinforcement.

Curing the preform 34 may be performed prior to bonding the preform 34.

Bonding the preform 34 may include bonding multiple layers 60, 62 of the preform 34 to the stator housing 26 and/or rotor mandrel 44. The layers 60, 62 may be made of respective different materials.

The extruded preform 34 may include a polymer material, a metal material and/or a ceramic material. If the preform 34 includes a polymer material, the material may comprise a shape memory polymer material.

Another method of constructing a stator 20 is described above. The method includes applying multiple polymer strips 56 to a bladder 36, and bonding the polymer strips 56 to a stator housing 26 while compressing the polymer strips 56 between the bladder 36 and the stator housing 26. The method is performed without injection molding.

The bladder 36 may be generally helical shaped. The bladder 36 may have multiple lobes 30 formed thereon. The lobes 24, 30 may extend helically about the bladder 36.

The method may be performed without injecting any polymer between the bladder 36 and the stator housing 26. Compressing the polymer strips 56 may include applying a pressure differential across the bladder 36.

A method of constructing a rotor 18 is also described above. The method includes applying multiple polymer strips 56 to a rotor mandrel 44, and bonding the polymer strips 56 to the rotor mandrel 44 while compressing the polymer strips 56 between a bladder 36 and the rotor mandrel 44. The method is performed without injection molding.

The bladder 36 may be generally helical shaped. The bladder 36 may have at least one lobe 24 formed therein. The lobe 24 may extend helically in the bladder 36. Compressing the polymer strips 56 may include applying a pressure differential across the bladder 36.

It is to be understood that the various embodiments of the present disclosure described above may be utilized in various orientations, such as inclined, inverted, horizontal, vertical, etc., and in various configurations and applications, without departing from the principles of the present disclosure. The embodiments are described merely as examples of useful applications of the principles of the disclosure, which are not limited to any specific details of these embodiments.

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of the present disclosure. Accordingly, the foregoing detailed description is to be clearly understood as being given by way of illustration and example only, the spirit and scope of the present invention being limited solely by the appended claims and their equivalents.

What is claimed is:

1. A method of constructing a stator/rotor assembly, the method comprising:

extruding at least one preform, the extruding comprising forming at least one lobe on the extruded preform, the lobe comprising a variation in thickness of the preform;

then positioning the extruded preform adjacent at least one of a stator housing and a rotor mandrel; and then bonding the extruded preform to the one of the stator housing and the rotor mandrel, wherein bonding the preform comprises compressing the preform between a bladder and the one of the stator housing and the rotor mandrel.

2. The method of claim 1, further comprising twisting the preform, thereby helically disposing the lobe, after extruding the preform.

3. The method of claim 1, wherein extruding the preform comprises extruding the preform such that it has a helical shape.

4. The method of claim 1, wherein extruding the preform comprises extruding the preform with helical lobes formed thereon.

5. The method of claim 1, wherein compressing the preform comprises applying a pressure differential across the bladder.

6. The method of claim 5, wherein applying the pressure differential comprises applying increased pressure to a side of the bladder opposite the preform.

7. The method of claim 5, wherein applying the pressure differential comprises reducing pressure on a side of the bladder facing the preform.

8. The method of claim 1, further comprising curing the preform while compressing the preform.

9. The method of claim 1, wherein the bladder has a generally helical shape.

10. The method of claim 1, wherein the bladder has a generally tubular non-helical shape.

11. The method of claim 1, further comprising incorporating nano reinforcement particles into the preform.

12. The method of claim 1, wherein the extruded preform comprises a stator lining having multiple lobes formed thereon.

13. The method of claim 1, wherein a first extruded preform is bonded to the stator housing, and a second extruded preform is bonded to the rotor mandrel.

14. The method of claim 1, wherein the extruded preform conforms to a generally helical shape of the one of the stator housing and the rotor mandrel.

15. The method of claim 1, wherein bonding the preform comprises compressing the preform against the one of the stator housing and the rotor mandrel by applying pressure to the preform.

16. The method of claim 15, wherein applying pressure to the preform further comprises impregnating the preform with a treatment.

17. The method of claim 16, wherein the treatment comprises at least one of a lubricant and a reinforcement.

18. The method of claim 1, further comprising curing the preform prior to bonding the preform.

19. The method of claim 1, wherein bonding the preform further comprises bonding multiple layers of the preform to the one of the stator housing and rotor mandrel.

20. The method of claim 19, wherein the layers are made of respective different materials.

21. The method of claim 1, wherein the extruded preform comprises a polymer material.

22. The method of claim 21, wherein the polymer material comprises a shape memory polymer material.

23. The method of claim 1, wherein the extruded preform comprises a metal material.

24. The method of claim 1, wherein the extruded preform comprises a ceramic material.

25. A method of constructing a stator, the method comprising:

applying multiple polymer strips to a bladder; and bonding the polymer strips to a stator housing while compressing the polymer strips between the bladder and the stator housing, wherein the method is performed without injection molding.

26. The method of claim 25, wherein the bladder is generally helical shaped.

27. The method of claim 25, wherein the bladder has multiple lobes formed thereon.

28. The method of claim 27, wherein the lobes extend helically about the bladder.

29. The method of claim 25, wherein the method is performed without injecting any polymer between the bladder and the stator housing.

30. The method of claim 25, wherein compressing the polymer strips comprises applying a pressure differential across the bladder.

31. A method of constructing a rotor, the method comprising:

applying multiple polymer strips to a rotor mandrel; and bonding the polymer strips to the rotor mandrel while compressing the polymer strips between a bladder and the rotor mandrel, wherein the method is performed without injection molding.

32. The method of claim 31, wherein the bladder is generally helical shaped.

33. The method of claim 31, wherein the bladder has at least one lobe formed therein.

34. The method of claim 33, wherein the lobe extends helically in the bladder.

35. The method of claim 31, wherein compressing the polymer strips comprises applying a pressure differential across the bladder.

* * * * *

UNITED STATES PATENT AND TRADEMARK OFFICE

CERTIFICATE OF CORRECTION

PATENT NO. : 8,734,141 B2
APPLICATION NO. : 12/876515
DATED : May 27, 2014
INVENTOR(S) : Jeremy B. Slay et al.

It is certified that error appears in the above-identified patent and that said Letters Patent is hereby corrected as shown below:

On the Title page, Item 73, Assignee:, cancel "P.C." and insert in place thereof -- Inc. --.

Signed and Sealed this
Fourteenth Day of April, 2015

Michelle K. Lee
*Director of the United States Patent and Trademark Office*